Patented Feb. 21, 1928.

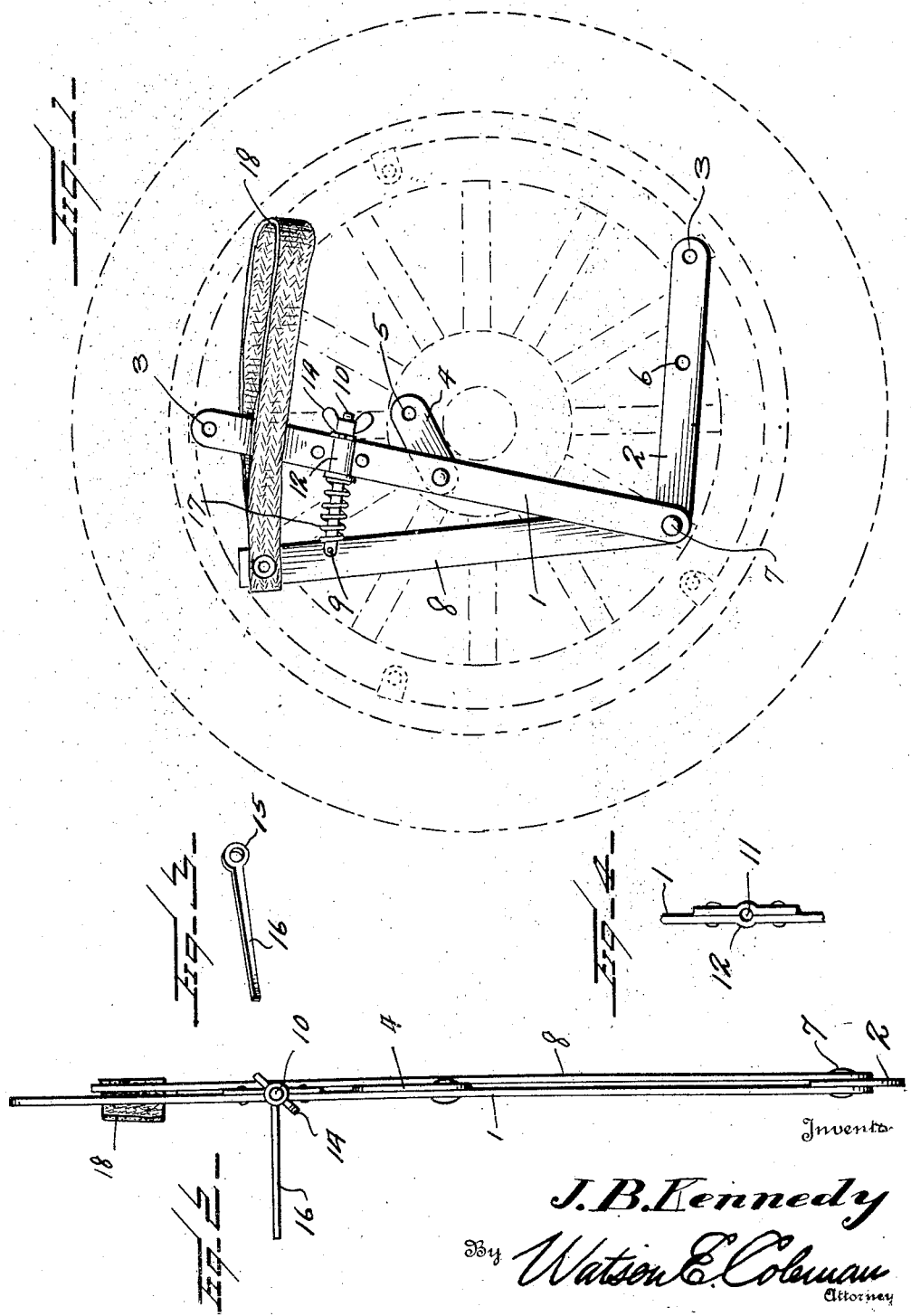

1,659,737

UNITED STATES PATENT OFFICE.

JAMES B. KENNEDY, OF NEW CASTLE, PENNSYLVANIA.

BRAKE-TESTING DEVICE.

Application filed July 8, 1926. Serial No. 121,202.

This invention relates to a brake testing device and it is an object of the invention to provide a device of this kind especially designed and adapted for use in connection with the braking wheels of an automobile to determine whether or not the brakes are properly set.

It is also an object of the invention to provide a device of this kind comprising two relatively movable members having a tensioning medium interposed therebetween and with means whereby one of the members is adapted to be applied to a wheel of the automobile and wherein the second member is provided with means to permit pull being imposed thereon against the action of the tensioning medium, together with a member operating to give requisite indication upon relative movement of both of the members when pull is imposed upon the second member.

The invention consists in the details of construction and in the combination and arrangement of the several parts of my improved brake testing device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in side elevation illustrating a testing device constructed in accordance with an embodiment of my invention in applied position, a coacting wheel being diagrammatically indicated by broken lines;

Figure 2 is a view in front elevation of the device as illustrated in Figure 1 with the loop strap in section;

Figure 3 is a view in perspective of the washer and indicating finger unapplied;

Figure 4 is a fragmentary detailed elevational view showing the enlarged tubular portion of one of the members.

As herein disclosed, 1 denotes an elongated member or bar of metal or other suitable rigid material having pivotally connected to one end portion thereof the supplemental member 2 of similar material, the outer extremities of the members 1 and 2 being provided with the openings 3 whereby said members may be readily engaged with the rim bolts of a wheel to properly apply the device thereto.

The members 1 and 2 are capable of relative swinging movement whereby the device may be adjusted to accommodate itself to wheels of various sizes. This relative movement of the members 1 and 2 also permits the device to be compacted or folded to occupy a minimum of space when not in use.

I also find it of advantage to pivotally engage with the central portion of the member 1 a short arm 4 having an opening 5 in its outer portion and also to provide the central portion of the member 2 with an opening 6. These openings 5 and 6 provide means whereby the device may be readily and conveniently engaged with the hub bolts generally employed in connection with disk wheels, it being preferable in practice that the body of the wheel be first removed.

The member 7 pivotally connecting the members 1 and 2 also provides a mounting for an end portion of an elongated rigid member 8 extending in the same general direction as the member 1 but preferably terminating inwardly thereof.

The outer end portion of the member 8 has pivotally connected thereto, as at 9, a shank 10 which is freely disposed through an opening 11 provided in an enlarged portion 12 of the member 1. This shank 10 outwardly of the member 1 has in threaded engagement therewith a nut 14 preferably of a wing type. Interposed between the applied nut 14 and the member 1 is a washer 15 provided with an outstanding elongated finger 16 for a purpose to be hereinafter more particularly referred to.

Interposed between the members 1 and 8 is a tensioning medium 17 herein disclosed as a coil spring encircling the shank 10 and the outer end portion of the member 8 has secured thereto a loop strap 18 providing a hand hold whereby requisite pull may be imposed upon the member 8 when the device is in use.

In practice, assuming it is desired to see whether or not the two rear brakes are set at substantially the same tension, the rear portion of the machine is raised or jacked up and the brakes set under such tension as to permit the wheel to be turned upon requisite pull. The device is then applied to one of the wheels and the nut 14 adjusted so that the tension of the spring 17 is such that when pull is imposed upon the member 8 through the medium of the loop strap 18, the member 8 will have slight movement inwardly toward the member 1 at substantially the same moment when the degree of pull is sufficient to turn the wheel against the action of the brake.

To determine this action, the finger 16, hereinbefore referred to, is disposed in substantially a horizontal position and just as soon as the member 8 has slight movement toward the member 1, the frictional contact of the nut 14 on the washer 15 will be released, permitting the finger 16 to drop. This, therefore, affords visual means whereby the operator can readily determine when the tension of the spring 17 has been properly adjusted. After the desired adjustment of the spring 17 has been effected in connection with one of the wheels, it is only necessary to properly apply the device to the second rear wheel and if the finger 16 drops at substantially the same movement the second wheel rotates against the action of its brake by pull upon the strap 18 it will show that both of the brakes are properly adjusted. However, if this desired action does not occur in connection with the second wheel, the brake mechanism coacting with such second wheel is adjusted until the desired result is accomplished.

If the automobile be of a four wheel brake type, the operation hereinbefore referred to is performed in connection with each of the front wheels except that the tension of the spring 17 is less than when employed in connection with the rear wheels because, as is well known, it is desired that the tension of the front wheel brakes be less than that of the rear wheels.

From the foregoing description it is thought to be obvious that a brake testing device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A wheel brake apparatus comprising arm members pivotally connected together at one end, one of the arm members being longer than the other, links pivotally connected with the longer arm member for connecting the same with a wheel, a pull member connected with the end of the shorter arm member and disposed transversely with relation to the longer arm member, a shank pivoted to the shorter arm member and slidably received in the longer arm member, a spring surrounding said shank and interposed between the arm members, a stop nut mounted upon the end portion of the shank, and a finger having an eye which receives the shank and which is located between the stop member and the longer arm member.

In testimony whereof I hereunto affix my signature.

JAMES B. KENNEDY.